Patented Jan. 28, 1936

2,028,762

UNITED STATES PATENT OFFICE 2,028,762

METHOD OF REDUCING THE VISCOSITY OF CELLULOSE ESTERS OF ORGANIC ACIDS

Camille Dreyfus, New York, N. Y., and George Schneider, Montclair, N. J., assignors to Celanese Corporation of America, a corporation of Delaware No Drawing. Application July 8, 1930, Serial No. 466,575

9 Claims. (Cl. 260—102)

This invention relates to the preparation of organic esters of cellulose and relates more particularly to the purification of such cellulose esters while at the same time lowering the viscosity characteristics thereof.

An object of our invention is to prepare organic esters of cellulose such as cellulose acetate that have low viscosity characteristics and which are more free from sulfur compounds than has been heretofore possible.

A further object of our invention is to treat cellulose acetate or other organic esters of cellulose by subjecting the same to the action of an aqueous liquid that is maintained at sufficiently elevated pressure and preferably at a temperature above the normal boiling point of water and corresponding to the temperature at which water has a vapor tension equal to such elevated pressure so that the viscosity characteristics thereof are materially reduced. Further objects of our invention will appear from the following detailed description.

In the making of cellulose acetate, generally cellulose is treated with an acetylating agent such as acetic anhydride in the presence of sulfuric acid or other sulfur-bearing compound as catalyst. During the acetylation, there may also be present solvents such as acetic acid or diluents. The cellulose acetate thus formed may or may not be subjected to an after treatment known as "ripening" to develop the desired solubility characteristics in the cellulose acetate and then the cellulose acetate is precipitated by the addition of water and carefully washed. Despite the ripening treatment and the careful washing, the resulting cellulose acetate contains quite an appreciable amount of sulfur, probably in the form of sulpho-cellulosic compounds. For many purposes, the presence of the sulpho-compounds is objectionable, as they have the disadvantage, among others, of tending to render the cellulose acetate unstable even at ordinary temperatures, as for instance, the cellulose acetate containing appreciable amounts of sulfur compounds tends to become brittle after a period of time and has other characteristics that are objectionable for some purposes. The finished cellulose acetate often has high viscosity characteristics, i. e. it forms viscous solutions with solvents. For many purposes, such as for making lacquers or other coating compositions, it is desirable that the viscosity characteristics be lower so that more cellulose acetate can be incorporated therein while the same is still freely flowing.

We have found that if cellulose acetate or other organic esters of cellulose that have been formed by the esterification of cellulose is subjected to boiling water or other aqueous liquid at sufficient super-atmospheric pressure and at a temperature above the normal boiling point of water (100° C.) for a sufficient period of time, appreciable amounts and even all of the sulfur compounds or other impurities are removed therefrom, while at the same time the viscosity characteristics of the cellulose acetate are materially reduced.

In accordance with our invention, we remove sulpho-compounds from and also reduce the viscosity characteristics of cellulose acetate or other organic esters of cellulose which were formed in the presence of a sulfur-bearing catalyst or other catalysts by subjecting the organic ester of cellulose while in solid form to the action of water at temperatures above the normal boiling point of water (100° C.) and at super-atmospheric pressure for a suitable period of time.

While this invention will be described in connection with the treatment of cellulose acetate it is equally applicable to other organic esters of cellulose such as cellulose formate, cellulose propionate and cellulose butyrate. To prepare the cellulose acetate, cellulose of any suitable kind such as cotton, cotton linters, purified wood pulp and the like is subjected to acetylation. The cellulose may be pretreated with acetic acid, formic acid or other lower fatty acids either in liquid or vapor form or it may be pretreated with a mixture of such acids and sulfuric acid or other catalyst to be employed in the esterification or with a mixture of acetic acid and acetic anhydride containing no catalyst. Any other form of pretreatment of the cellulose may be employed or the cellulose may be acetylated without any pretreatment whatsoever.

The cellulose acetate may be prepared by the solution method, wherein the cellulose, pretreated or not, is subjected to the action of an acetylation bath containing an appropriate amount of acetic anhydride, a catalyst, and a solvent such as acetic acid, the acetylation bath containing acetic acid or other solvent in sufficient quantity to form a solution or dope of cellulose acetate that is formed. The cellulose acetate in the dope or solution form may or may not be "ripened" and then precipitated.

On the other hand, the cellulose acetate may be prepared by the suspension method wherein the cellulose, pretreated or not, is subjected to the action of an acetylating bath containing an appropriate amount of acetic anhydride, the catalyst and a diluent or non-solvent for the cellulose acetate such as benzol, toluol, ethyl ether, isopropyl ether or carbon tetrachloride. The acetylation bath preferably, but not necessarily, also contains some acetic acid, but the quantity thereof is not sufficient to form with the diluent present a solvent mixture for the cellulose acetate that is formed.

The acetylation catalyst employed may be sulfuric acid or other sulfur-bearing catalyst such as sulfur chloride, the bi-sulfates of sodium, potassium or methylamine, or other bi-sulfates, chlor sulphonic acid, dimethyl sulfate, etc. However, the treatment of cellulose acetate prepared in the presence of other catalysts such as zinc chloride is not excluded.

The cellulose acetate, in accordance with our invention, is treated with water or aqueous liquid preferably at temperatures above 100° C. In order to attain these temperatures, pressure is caused to develop by heating a closed vessel in which the treatment is taking place, and the temperature will depend upon such pressure, as is well understood. Heating may also be performed by injection of steam at high pressure. Generally super-atmospheric pressures of 20 to 250 lbs. per square inch or more will be employed, and the temperatures are those at which water develops such vapor pressures. The amount of water used is generally from 4 to 50 or more times the weight of the cellulose acetate being treated and the time of treatment may vary from a few minutes to 20 hours or more. Definite figures cannot be given, since there is an inter-relationship between the pressures and temperatures employed, the amount of water used and the time of treatment. The greater the amount of pressure and temperature used, the less time is required and at the high pressures only a relatively short time is necessary. Likewise for larger amounts of water less pressure and less time is required. We have found that the use of distilled water produces excellent results, and therefore we prefer to employ relatively soft water, or distilled water.

We have found that at higher pressures and temperatures of treatment, the viscosity characteristics of the cellulose acetate can be reduced to any desired extent by controlling the time of treatment. Prolonged treatment at lower temperatures and pressures will also reduce the viscosity characteristics. By way of example, it is pointed out that if a cellulose acetate having a viscosity of 21 is heated with water in an autoclave until a pressure of 120 lbs. per square inch develops and such temperature and pressure are maintained for one hour, the viscosity of the cellulose acetate is reduced to 5, while if the pressure is raised to 140 lbs. per square inch and maintained for one hour, the viscosity of the cellulose acetate is reduced to 1.5. If the same cellulose acetate is heated with water until a pressure of 180 lbs. per square inch develops and after the pressure is maintained for one minute the mixture is allowed to cool, the cellulose acetate has a viscosity of 7. When a cellulose having a viscosity of 18 is digested with water at a developed pressure of 100 lbs. per square inch for 3 hours, the resulting product has a viscosity of 3.5. When a cellulose acetate of 20 viscosity is digested with water under a developed pressure of 60 lbs. per square inch, after 2 hours treatment it has a viscosity of 9 while after 6 hours treatment it has a viscosity of 4.5. A digestion under a developed pressure of 20 lbs. per square inch for 7 hours reduces the viscosity of a cellulose acetate from 19 to 13. The units of viscosity are those described in specification D—50 of the British Aircraft Board.

Some organic esters of cellulose might decompose if the temperature of treatment is too high, and therefore in treating such cellulose esters, the temperature of treatment should be below that at which decomposition takes place. This temperature of decomposition depends upon the nature of the particular cellulose ester, the impurities such as sulfo-compounds contained therein, and the decomposition products produced during the treatment.

A cellulose acetate of high viscosity say above 30 to 35 has many desirable characteristics such as tensile strength, etc. However such cellulose acetate produces solution of such high viscosity that in order to make a solution or plastic of sufficient fluidity or plasticity for working, so much solvent must be employed that the solid content is reduced to an undesirably low degree. We have found that if such cellulose acetate of high viscosity is subjected to the method of this invention, the resulting product has sufficiently low viscosity to be workable and yet has a large percentage of the strength and other desirable characteristics of the original high viscosity cellulose acetate.

During the treatment with water at the elevated temperatures and pressures, sulfuric acid develops. When the original cellulose acetate contains a relatively high proportion of sulfur compounds, this sulfuric acid may cause hydrolysis to a greater extent than is desired. In this case the water of treatment may be changed either intermittently or continuously or such water may be either intermittently or continuously withdrawn and the acid neutralized with alkali.

It is advantageous to give the cellulose acetate a final washing with water.

As to the sulfur content it is pointed out that if a cellulose acetate having sulfur compound content corresponding to as high as 0.15% determined as sulfate ($SO_4$) can be reduced to as low as 1.10 down to 0.01%, 0.005% or even to no sulfur compound content, depending upon the time, temperature and pressure of treatment. A cellulose acetate having an original charring point of 200 can be treated by this invention, and have a charring point of 230° to 260° C. or more imparted thereto. The term charring point means the temperature at which the material assumes a dark color or chars.

Any suitable form of apparatus may be employed for carrying out this invention. Thus if a batch process is to be employed, the cellulose acetate and water may be placed in an autoclave which is heated until the desired pressure develops. For a continuous process, the mixture of the water and cellulose acetate may be passed continuously through an autoclave or through heated passages, such as pipes, coils and the like that are maintained at the required pressure and until the required temperature is attained. The heating may be done externally or by injection of high pressure steam. This pressure may be maintained by a pressure release valve at the exit of the passageway, or the pipes or coils may be connected with stand pipes of sufficient height so as to develop a hydrostatic pressure corresponding to that required. The length of the passage and the rate of flow is regulated so that the cellulose acetate is subjected to the treatment for the required period of time.

By this method it is possible to obtain cellulose acetate having a low viscosity which is but a fraction of that of the original material. Such low viscosity cellulose acetate is eminently suitable for use in lacquers or other coating compositions. In the making of yarns, films or celluloid-like articles, solutions or plastics containing much larger percentages of the cellulose acetate prepared in accordance with this invention and much smaller percentages of solvents can be employed, which solutions or plastics still have the same fluidity as less concentrated solutions of cellulose acetate of higher viscosity. From an economical point of view this is highly important, since with reduced amount of solvents, a greater output with less cost of solvent recovery is attainable.

Having described our invention, what we desire to secure by Letters Patent is:

1. Method of reducing the viscosity of a cellulose ester of an organic acid which is free from combined sulfur comprising subjecting the cellulose ester to an aqueous liquid under super-atmospheric pressures and at temperatures above 100° C. until its viscosity is materially reduced.

2. Method of reducing the viscosity of cellulose acetate which is free from combined sulfur comprising subjecting the cellulose acetate to an aqueous liquid under super-atmospheric pressures and at temperatures above 100° C. until its viscosity is materially reduced.

3. Method of reducing the viscosity of a cellulose ester of an organic acid which is free from combined sulfur comprising continuously passing the mixture of the cellulose ester and water through a heated passage that is maintained at such super-atmospheric pressures and elevated temperatures that its viscosity is reduced and continuously discharging the mixture from the passage.

4. Method of reducing the viscosity of cellulose acetate which is free from combined sulfur comprising continuously passing the mixture of the cellulose acetate and water through a heated passage that is maintained at such super-atmospheric pressures and elevated temperatures that its viscosity is reduced and continuously discharging the mixture from the passage.

5. Method of reducing the viscosity of cellulose acetate which is free from combined sulfur comprising heating the cellulose acetate and water until super-atmospheric pressure develops and maintaining such conditions until the viscosity of the cellulose is reduced to less than 50%.

6. Method of reducing the viscosity of cellulose acetate which is free from combined sulfur comprising heating the cellulose acetate and water until superatmospheric pressure above 50 lbs. per square inch develops and maintaining such conditions until the viscosity of the cellulose acetate is materially reduced.

7. Method of reducing the viscosity of cellulose acetate which is free from combined sulfur comprising heating the cellulose acetate and water until superatmospheric pressure above 100 lbs. per square inch develops and maintaining such conditions until the viscosity of the cellulose acetate is materially reduced.

8. Method of preparing cellulose acetate of reduced viscosity comprising treating cellulose acetate which is free from combined sulfur with an aqueous liquid at super-atmospheric pressures and temperatures above 100° C., and then further treating the same with fresh aqueous liquid at super-atmospheric pressures and temperatures above 100° C. until its viscosity is materially reduced.

9. Method of preparing cellulose acetate of reduced viscosity comprising treating cellulose acetate which is free from combined sulfur with an aqueous liquid at super-atmospheric pressures and at temperatures above 100° C. and continuously replacing at least part of the aqueous liquid with fresh aqueous liquid during the treatment and continuing the treatment until the viscosity of the cellulose acetate is materially reduced.

CAMILLE DREYFUS.
GEORGE SCHNEIDER.